(12) United States Patent
Kinoshita et al.

(10) Patent No.: US 8,506,146 B2
(45) Date of Patent: Aug. 13, 2013

(54) VEHICLE HEAD LAMP

(75) Inventors: Masao Kinoshita, Shizuoka (JP);
Akinori Matsumoto, Shizuoka (JP);
Tomoyuki Moritani, Shizuoka (JP);
Takahiro Suzuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 143 days.

(21) Appl. No.: 13/004,448

(22) Filed: Jan. 11, 2011

(65) Prior Publication Data

US 2011/0170308 A1    Jul. 14, 2011

(30) Foreign Application Priority Data

Jan. 14, 2010  (JP) ................................. 2010-005395

(51) Int. Cl.
*B60Q 1/00* (2006.01)
*F21V 11/00* (2006.01)
*F21V 7/00* (2006.01)

(52) U.S. Cl.
USPC ............ 362/539; 362/516; 362/517; 362/518

(58) Field of Classification Search
USPC .......................................... 362/539, 516–518
See application file for complete search history.

(56) References Cited

U.S. PATENT DOCUMENTS

| 4,268,895 | A  | * | 5/1981  | Yabata ........................... 362/519 |
| 4,922,386 | A  | * | 5/1990  | Bockeler et al. ............... 362/539 |
| 6,736,533 | B2 | * | 5/2004  | Matsumoto et al. .......... 362/539 |
| 7,350,948 | B2 |   | 4/2008  | Nino et al. |
| 7,513,648 | B2 | * | 4/2009  | Rotgeri et al. ................. 362/263 |
| 7,789,545 | B2 | * | 9/2010  | Cheng et al. ................... 362/539 |
| 8,092,059 | B2 | * | 1/2012  | Yamagata ...................... 362/539 |
| 2007/0147062 | A1 |  | 6/2007 | Nino et al. |
| 2007/0247865 | A1 | * | 10/2007 | Kinoshita et al. ............. 362/538 |

FOREIGN PATENT DOCUMENTS

JP    2007-179994 A    7/2007

* cited by examiner

*Primary Examiner* — David J Makiya
(74) *Attorney, Agent, or Firm* — Sughrue Mion, PLLC

(57) ABSTRACT

A vehicle head lamp includes: a light source; a reflector that reflects light emitted from the light source; a condenser lens that irradiates the light reflected by the reflector forward; and a shade that blocks part of the light reflected by the reflector to obtain a desired light distribution. The shade includes a main shade that has an opening for passing overhead sign light irradiated forward and upward and a sub-shade that is provided so as to be inclined rearward and downward from an upper edge of the main shade in order to obtain a cut line of the light distribution, and the reflector has an OHS reflection area used to project part of the reflected light toward a lower surface of the sub-shade and that allows the light reflected on the lower surface to pass through the opening of the main shade as the OHS light.

9 Claims, 8 Drawing Sheets

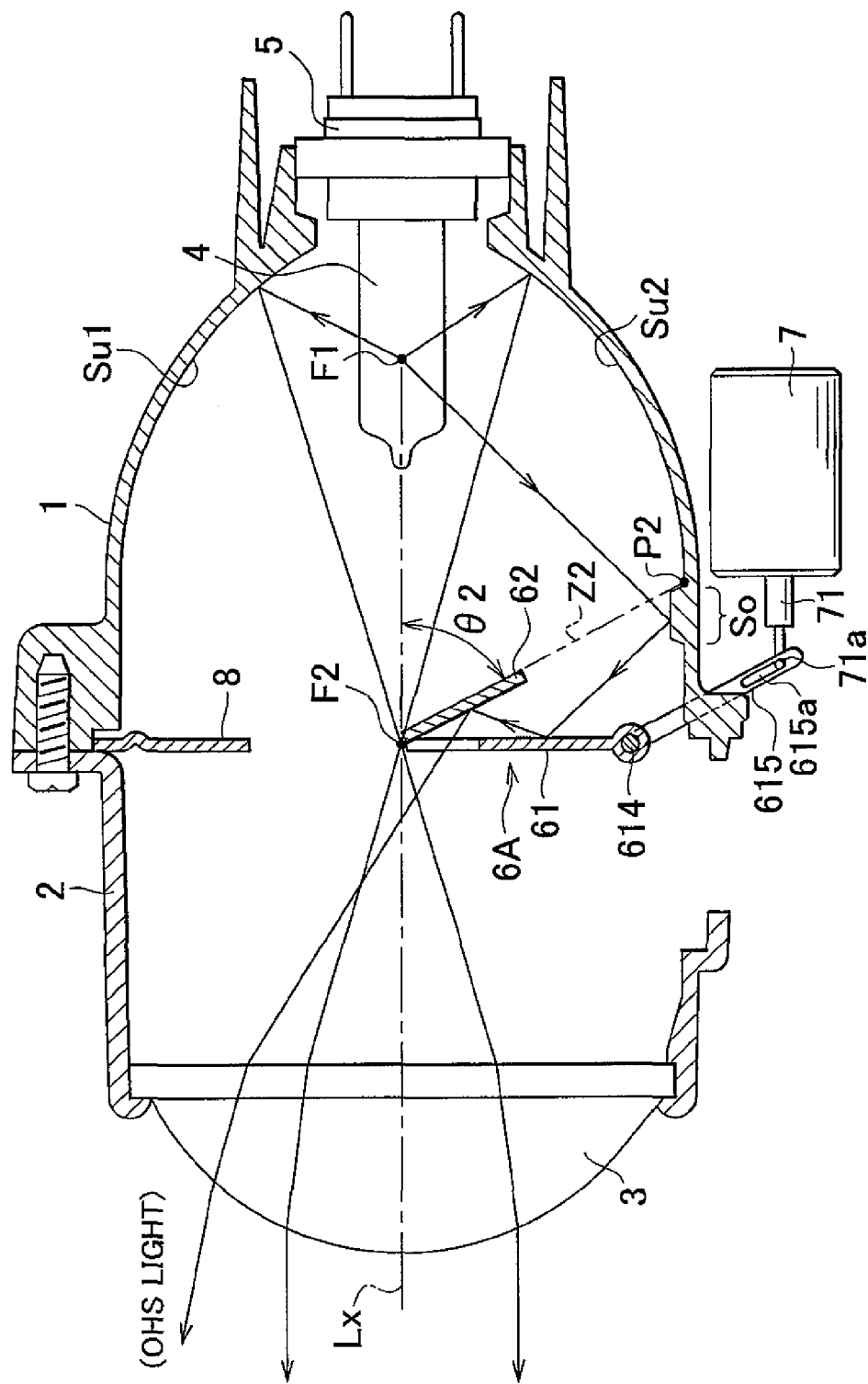

VEHICLE HEAD LAMP

INCORPORATION BY REFERENCE

The disclosure of Japanese Patent Application No. 2010-005395 filed on Jan. 14, 2010 including the specification, drawings and abstract is incorporated herein by reference in its entirety.

BACKGROUND OF THE INVENTION

1. Field of the Invention

The invention relates to a vehicle head lamp that is able to irradiate OHS light that illuminates an overhead sign (hereinafter, also referred to as "OHS") that is a sign located forward and upward of a vehicle.

2. Description of the Related Art

There is proposed a head lamp that is configured to illuminate an OHS in a low beam light distribution as a head lamp for a vehicle, such as an automobile. Japanese Patent Application Publication No. 2007-179994 (JP-A-2007-179994) describes that a light-blocking shade for forming a low beam light distribution partially has an opening and then light passing through the opening is used as OHS light. FIG. 8 shows a head lamp that is described in JP-A-2007-179994. The head lamp reflects light, emitted from a light source 4, on a reflection surface of a reflector 1 having a rotational ellipsoidal shape, blocks part of the reflected light with a shade 6B, condenses non-blocked light with a condenser lens 3 supported by a holder 2 and outputs the non-blocked light forward of the lamp to illuminate a front area of a host vehicle. The shade 6B is formed of a main shade 61 and a sub-shade 62. The main shade 61 is used to block light irradiated upward in order to obtain a low beam light distribution. The sub-shade 62 is used to form a cut line of the low beam light distribution. The main shade 61 is substantially vertical with respect to a lamp optical axis Lx. The sub-shade 62 is arranged so as to be inclined at a desired inclination angle θ0 with respect to the lamp optical axis Lx. The main shade 61 has an opening 613 below a light transmission window 611. The main shade 61 allows the opening 613 to pass part of light reflected by the reflector 1 to thereby generate light irradiated upward, and then irradiates the light as OHS light.

In the head lamp shown in FIG. 8, light reflected by an upper reflection area of the reflection surface of the reflector 1 above the lamp optical axis Lx and light reflected by a lower reflection area of the reflection surface of the reflector 1 below the lamp optical axis Lx are not blocked by the shade 6B, but become light that contributes to a low beam light distribution. Part of light reflected by a portion of the lower reflection area adjacent to the front side is blocked by the shade, and another part of light passes through the opening 613 to become OHS light. Thus, substantially all the surface of the upper reflection area is formed as an effective reflection area Su1. On the other hand, for the lower reflection area, when a position PO at which an imaginary extension plane Z0 extended rearward along an inclined plane of the sub-shade 62 intersects with the reflection surface of the reflector 1 is obtained, light reflected by a reflection area rearward of the lamp with respect to the intersection position P0 within the lower reflection area is not blocked by the shade 6B but becomes light that contributes to a low beam light distribution. This area is an effective reflection area Su2. In addition, part of light reflected by a portion of the area on a front side of the effective reflection area Su2 is blocked by the shade 6B, and another part of the reflected light passes through the opening 613 to become OHS light. The area that reflects light that becomes OHS light is an OHS reflection area So. The OHS reflection area So is designed so as to be different in surface shape from the effective reflection area Su2 so that reflected light efficiently passes through the opening 613. Note that an area Sn is an ineffective reflection area that does not contribute to a light distribution.

In recent years, there is proposed a head lamp that is intended to reduce electric power consumed by an automobile. A head lamp of this type is required to increase an effective utilization efficiency at which light emitted from a light source is effectively utilized as illumination light, and it is conceivable that the area of the effective reflection area of the reflector is expanded as one of measures for the above request in order to increase the amount of light reflected by the reflector. That is, in the case of the head lamp shown in FIG. 8, when an inclination angle θ0 of the sub-shade 62 with respect to the lamp optical axis Lx is increased as much as possible, the intersection position P0 of the imaginary extension plane Z0 of the sub-shade 62 and the reflection surface of the reflector 1 shifts forward, so the effective reflection area Su2 may be expanded. Therefore, light blocked by the shade 6B is reduced. Thus, it is possible to obtain a low beam light distribution that has a high effective utilization efficiency of light emitted from the light source 4.

However, if the inclination angle θ0 is simply increased as in the case of a sub-shade 62X shown by the imaginary line in FIG. 8, the OHS reflection area So shifts forward accordingly, so an inclination angle of light, which is reflected by the OHS reflection area So, passes between the main shade 61 and the sub-shade 62X and then passes through the opening 613 of the main shade 61, with respect to the lamp optical axis Lx also increases. If the inclination angle θ0 exceeds a certain angle, light that passes through the opening 613 does not enter the condenser lens 3 as in the case of a light beam La shown in FIG. 8, and it is difficult for the light to function as OHS light. In order for the light passing through the opening 613 to pass through the condenser lens 3, the inclination angle θ0 of the sub-shade 62 needs to be limited to an angle corresponding to the lens aperture and lens focal length of the condenser lens 3. This also limits an increase in the effective reflection area Su2 of the reflector 1.

SUMMARY OF INVENTION

The invention provides a vehicle head lamp that ensures effective OHS light while expanding an effective reflection area as much as possible to increase the utilization efficiency of light emitted from a light source.

An aspect of the invention relates to a vehicle head lamp that includes: a light source; a reflector that reflects light emitted from the light source; a condenser lens that irradiates the light reflected by the reflector forward; and a shade that blocks part of the light reflected by the reflector to obtain a desired light distribution. In the head lamp, the shade includes a main shade that has an opening for passing overhead sign light irradiated forward and upward and a sub-shade that is provided so as to be inclined rearward and, downward from an upper edge of the main shade in order to obtain a cut line of the light distribution, and the reflector has an OHS reflection area that is used to project part of the reflected light toward a lower surface of the sub-shade and that allows the light reflected on the lower surface to pass through the opening of the main shade as the OHS light.

With the above configuration, part of light reflected by the OHS reflection area provided for the reflector is projected toward the lower surface of the sub-shade, and light reflected on the lower surface is allowed to pass through the opening formed in the main shade to obtain OHS light, so the inclination angle of the sub-shade with respect to the lamp optical axis may be increased, and the OHS reflection area may be shifted to the front side of the reflector accordingly. Thus, the area of the effective reflection area for obtaining a desired light distribution is increased, so effective OHS light is ensured even with a small size, while the utilization efficiency of light from the light source is improved to make it possible to perform illumination with a bright light distribution.

BRIEF DESCRIPTION OF DRAWINGS

The features, advantages, and technical and industrial significance of this invention will be described below with reference to the accompanying drawings, in which like numerals denote like elements, and wherein:

FIG. 5 is a sectional view of a head lamp forming a low beam light distribution according to a second embodiment;

DETAILED DESCRIPTION OF EMBODIMENTS

Figure 1:
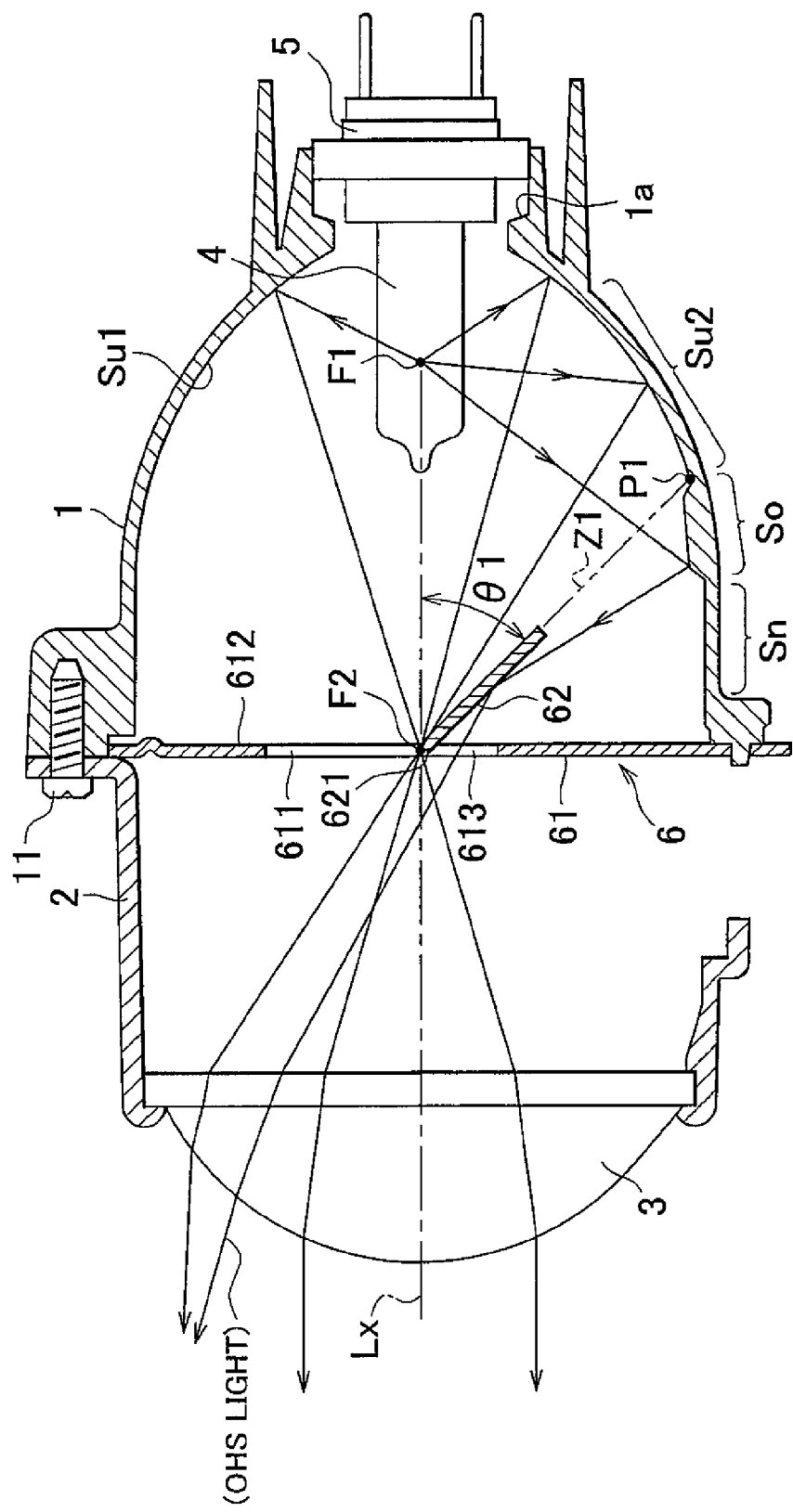
FIG. 1 is a sectional view of a head lamp according to a first embodiment of the invention.

A first embodiment of the invention will be described with reference to the accompanying drawings. FIG. 1 is a sectional view of a head lamp 1 in which the aspect of the invention is applied to a projector head lamp of an automobile for providing a low beam light distribution. The head lamp 1 includes a reflector 1. The reflector 1 has a reflection surface that is formed as a rotational ellipsoidal surface, and has a lateral bowl shape of which the major axis of the ellipsoidal surface coincides with a lamp optical axis Lx. An annular holder 2 is connected to a front end opening of the reflector 1. The holder 2 holds a condenser lens 3. A light source 4 is installed inside the reflector 1. The light source 4 is supported by a socket 5 fitted to a rear opening 1a. Here, an incandescent lamp, that is, an incandescent bulb, is used as the light source 4. In the light source 4, a light emitting point is arranged at a first focal point F1 of the reflector 1. In addition, a second focal point F2 of the reflector 1 substantially coincides with a rear focal point of the condenser lens 3. A shade 6 (specifically, the upper end of a sub-shade 62, which will be described later) is arranged at the second focal point F2, and is supported so as to be sandwiched by the reflector 1 and the holder 2.

Figure 2:
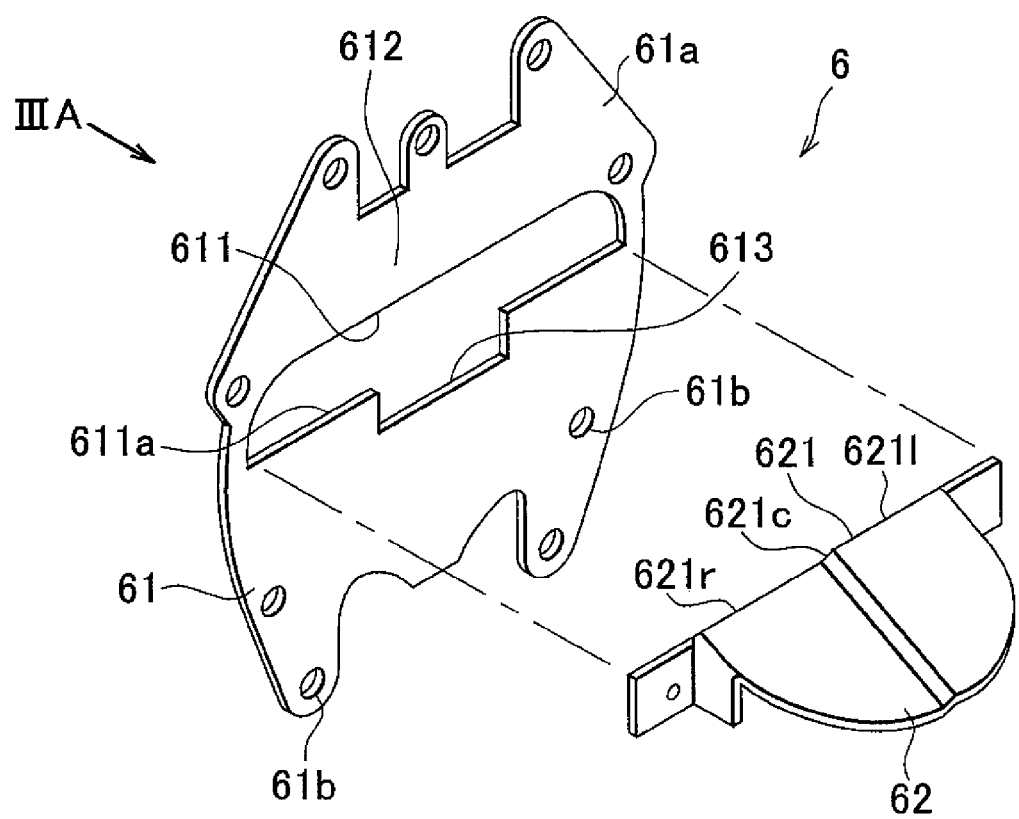
FIG. 2 is a partially exploded perspective view of a shade.
Figure 3A:
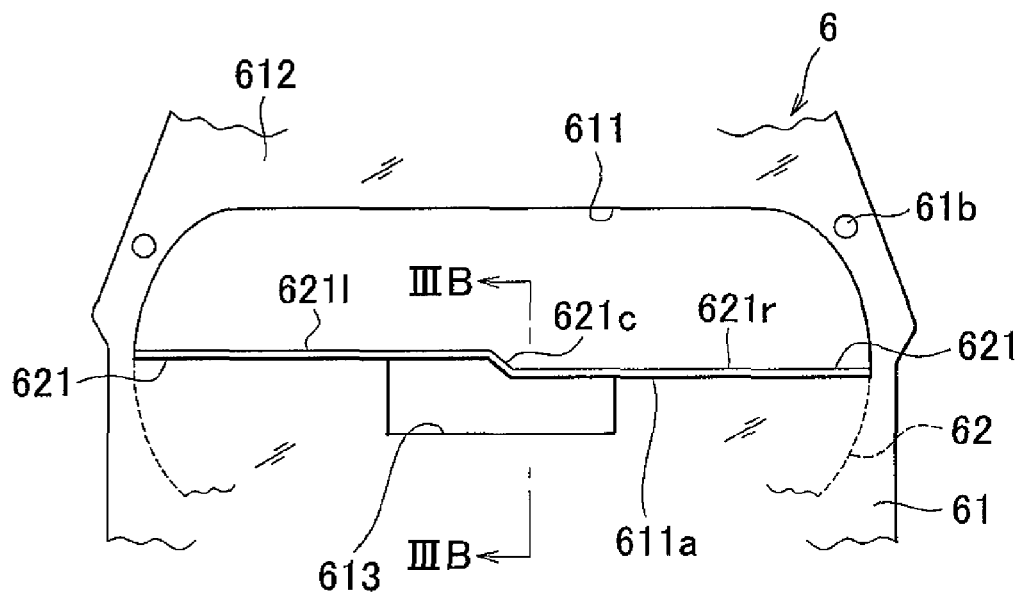
FIG. 3A is a front view of the shade when viewed in the direction indicated by IIIA in FIG. 2.
Figure 3B:
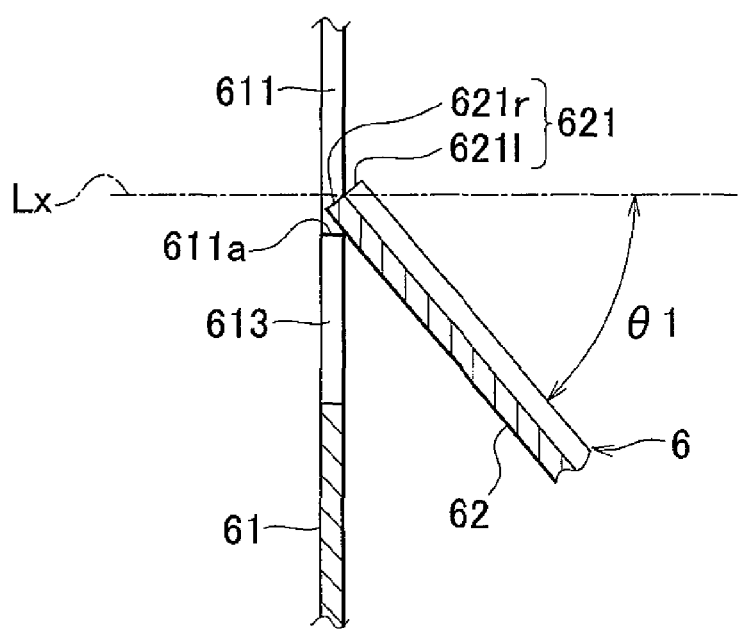
FIG. 3B is an enlarged sectional view that is taken along the line IIIB-IIIB in FIG. 3A.

As shown by an external perspective view as seen from the rear side in FIG. 2, the shade 6 is formed of a main shade 61 and the sub-shade 62. The main shade 61 is extended substantially perpendicularly with respect to the lamp optical axis Lx. The sub-shade 62 is inclined with respect to the lamp optical axis Lx on the rear surface side of the main shade 61. FIG. 3A is a front view of the shade 6 when viewed in the direction indicated by IIIA in FIG. 2. FIG. 3B is an enlarged sectional view that is taken along the line IIIB-IIIB in FIG. 3A. The main shade 61 has a plurality of holes 61b at a peripheral portion 61a. The plurality of holes 61b are used to insert screws 11 (see FIG. 1) for connecting the holder 2 to the reflector 1. The main shade 61 is supported so as to be sandwiched by the reflector 1 and the holder 2 with the screws 11. The main shade 61 has a light transmission window 611 that is opened in a desired shape in order to form a light distribution area within an area located above the lamp optical axis Lx. Furthermore, an upper area of the main shade 61 above the light transmission window 611 is formed as an abnormal light blocking portion 612 for blocking abnormal light arising from scattering light, or the like, inside the reflector 1. In addition, a lower edge 611a of the light transmission window 611 is extended substantially horizontally toward right and left sides with respect to the lamp optical axis Lx at a position that is slightly lower than the second focal point F2. A laterally long rectangular opening 613 is cut out downward in a laterally center area of the lower edge 611a so as to be continuous with the light transmission window 611. The opening 613 serves as a window that passes OHS light, as will be described later.

Figure 8:
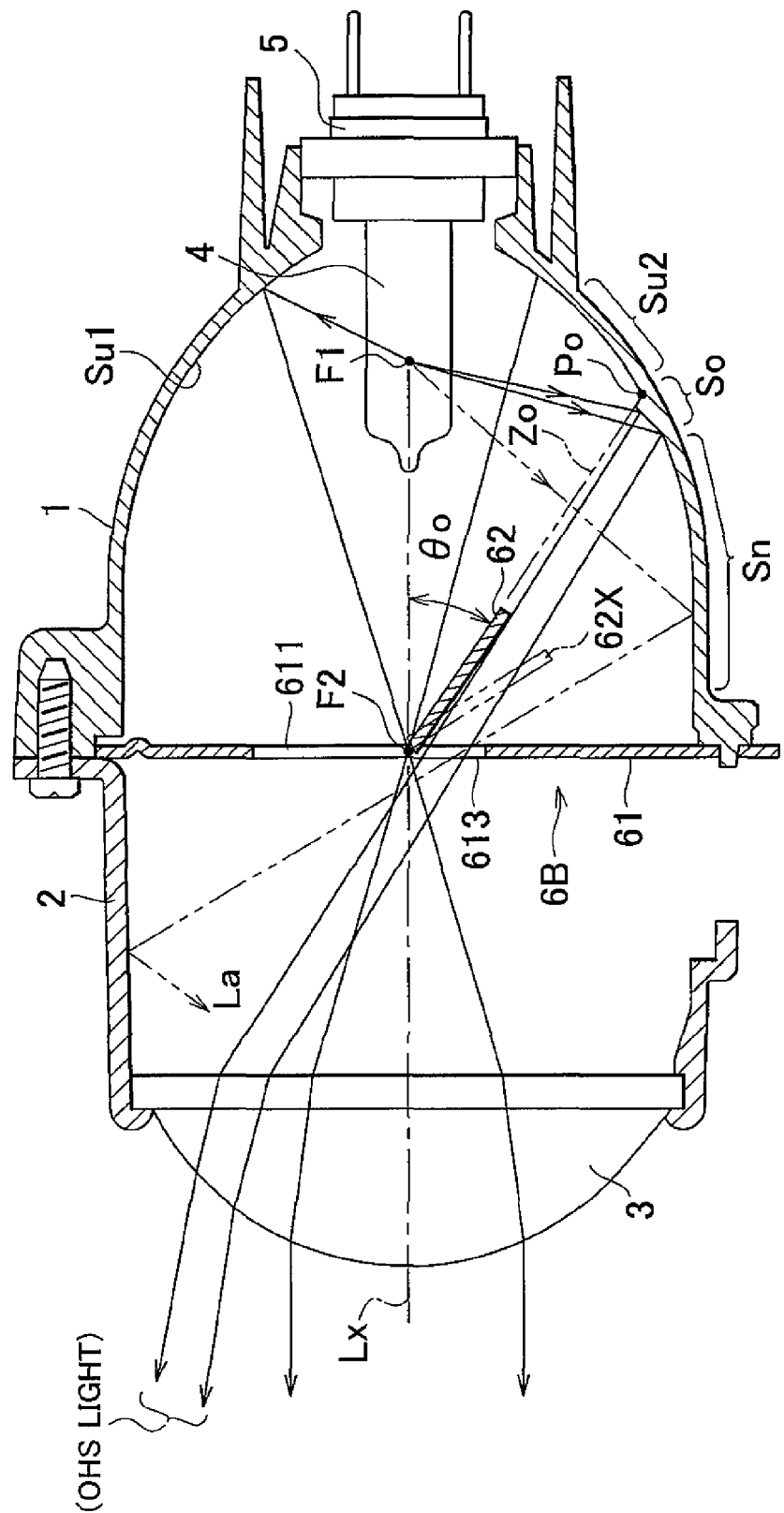
FIG. 8 is a sectional view of a head lamp according to the related art.

The sub-shade 62 is extended along the rear surface of the main shade 61, and is supported integrally with the main shade 61 so that the sub-shade 62 is inclined downward at a desired angle $\theta 1$ with respect to the lamp optical axis LX from the front end toward the rear end. A front edge 621 of the sub-shade 62 is arranged along the lower edge 611a of the light transmission window 611 of the main shade 61. In order to form a cut line of a low beam light distribution, a center portion 621c is formed in a stepwise manner so as to be inclined laterally as shown in FIG. 3A. A left edge portion 621l and a right edge portion 621r that extend laterally from the center portion are formed as edge portions that have different levels in height in correspondence with the stepped center portion 621c and that extend horizontally. The sub-shade 62 is subjected to bending in the thickness direction in correspondence with the front edge 621. An inclination angle $\theta 1$ of the sub-shade 62 with respect to the lamp optical axis Lx is larger than the inclination angle $\theta 0$ of the sub-shade according to the related art shown in FIG. 8, and is designed so that a position P1 at which an imaginary extension plane Z1 that is extended rearward and downward from the upper surface of the sub-shade 62 intersects with the reflection surface of the reflector 1 shifts toward a front side of the reflector 1 with respect to the intersection position P0 associated with the sub-shade according to the related art. In addition, the inclination angle $\theta 1$ is designed to be an angle at which the imaginary extension plane Z1 intersects with the upper edge portion of the condenser lens 3 when the imaginary extension plane Z1 is extended forward and upward or an angle at which the imaginary extension plane Z1 falls slightly above the upper edge portion. In other words, the inclination angle $\theta 1$ is designed so that, when light reflected by the reflector 1 advances along the upper surface of the sub-shade 62, the light enters the peripheral portion of the condenser lens 3, and light reflected at an angle larger than the inclination angle $\theta 1$ does not enter the condenser lens 3. Furthermore, the lower surface of the sub-shade 62 is formed as a surface that reflects light, such as a mirror surface.

The reflection surface of the reflector 1 is configured so that an upper reflection area above the lamp optical axis Lx is formed as an effective reflection area Su1. In addition, within a lower reflection area below the lamp optical axis Lx, an area spreading rearward from the position P1 at which the imaginary extension plane Z1 extended rearward and downward from the sub-shade 62 intersects with the reflection surface is also formed as an effective reflection area Su2. In addition, a narrow area on a front side of the effective reflection area Su2 within the lower reflection area is formed as an OHS area So. In the first embodiment, the reflection surface of the OHS reflection area So is designed so that, when light emitted from the light source 4 is reflected by the OHS reflection area So, the reflected light is projected to the lower surface of the sub-shade 62 at a desired incident angle. That is, in the related art shown in FIG. 8, light reflected by the OHS reflection area So directly passes through the opening 613 of the main shade 61; whereas, in the first embodiment, light reflected by the OHS reflection area So is projected to the lower surface of the sub-shade 62 and light reflected by the lower surface passes through the opening 613. It is applicable that the reflection surface of the OHS reflection area So is designed to have a diffused reflection structure that spreads reflected light laterally and is able to illuminate an area toward which OHS light, which will be described later, is irradiated with uniform brightness. Note that an area Sn is an ineffective reflection area.

Figure 4A:
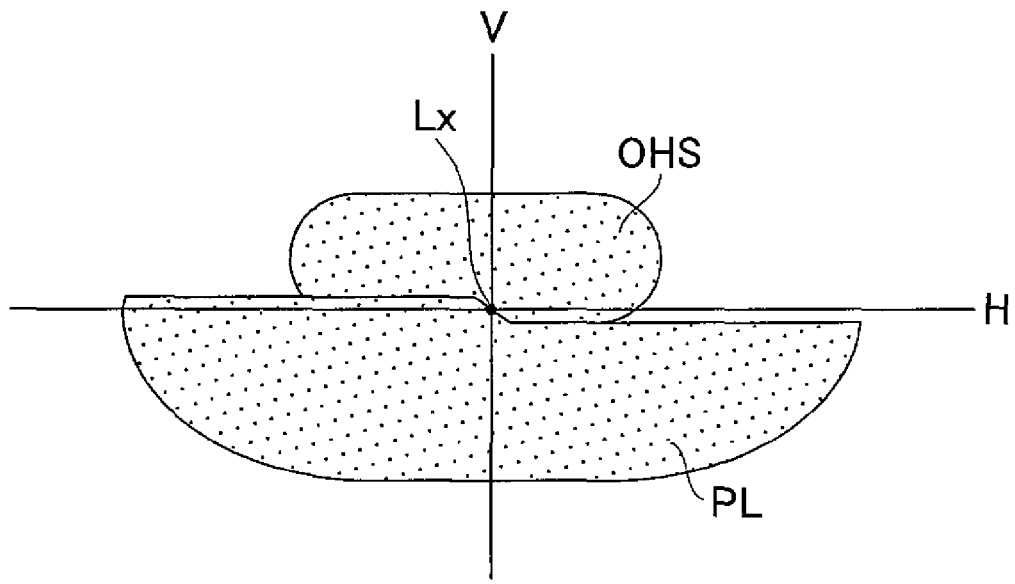
FIG. 4A is a light distribution diagram of a low beam light distribution.

In the head lamp according to the first embodiment, as shown in FIG. 1, a large majority of light emitted from the lit light source 4 is reflected by the effective reflection areas Su1 and Su2 and is condensed to the second focal point F2. The shade 6 that shields the area below the lamp optical axis Lx is arranged at the second focal point F2, so, particularly, light reflected by the upper effective reflection area Su1 and condensed to the area below the lamp optical axis Lx is blocked by the main shade 61 of the shade 6, and the other non-blocked light enters the condenser lens 3 and is irradiated forward of the lamp by the condenser lens 3. At this time, light near the lamp optical axis Lx is blocked in accordance with the shape of an upper edge 621 of the sub-shade 62, so, as shown in FIG. 4A, a low beam light distribution PL having a cut line corresponding to the shape of the upper edge 621 is formed. In the first embodiment, because the inclination angle $\theta 1$ of the sub-shade 62 is designed to be larger than that according to the related art, the position P1 at which the imaginary extension plane Z1 along the sub-shade 62 intersects with the reflection surface shifts toward a front side as compared with that according to the related art, and the area of the effective reflection area Su2 that reflects light condensable to the second focal point F2 expands by that much, so the amount of light of the low beam light distribution PL is increased. Thus, a light distribution characteristic with brightness required of the head lamp may be implemented even by a low-power light source.

In addition, within light emitted from the light source 4, light projected to the OHS reflection area So is reflected by the OHS reflection area So and is projected to the lower surface of the sub-shade 62. After that, the light is further reflected by the lower surface of the sub-shade 62, and passes through the opening 613 of the main shade 61. Then, the light is condensed by the condenser lens 3 and is irradiated toward an area forward and upward of the host vehicle as OHS light. Because the inclination angle $\theta 1$ of the sub-shade 62 is larger than that according to the related art, when light reflected by the reflector 1 directly passes through the opening 613, the reflected light does not enter the condenser lens 3 because of the excessively large incident angle with respect to the condenser lens 3; however, the incident angle of the reflected light with respect to the condenser lens 3 is reduced through reflection on the lower surface of the sub-shade 62, so the reflected light reliably enters the condenser lens 3, and OHS light is irradiated forward and upward by the condenser lens 3. By so doing, it is possible to illuminate an OHS present in an area forward and upward of the vehicle.

In this way, by appropriately designing the angle at which light from the light source 4 is reflected by the OHS reflection area So and the inclination angle $\theta 1$ of the sub-shade 62, even when the angle at which light from the light source 4 is reflected by the OHS reflection area So is increased, the reflected light may be reflected on the lower surface of the sub-shade 62 to pass through the opening 613 and then may be effectively utilized as OHS light. On the other hand, because the inclination angle of the sub-shade 62 is increased, the boundary of the effective reflection area Su2 in the lower reflection area may be shifted toward a front side to increase the area of the effective reflection area Su2. By so doing, it is possible to form the head lamp that achieves low power consumption and that also achieves illumination of an OHS.

Here, increasing the inclination angle $\theta 1$ of the sub-shade 62 is effective for increasing the area of the effective reflection area Su2 in the lower reflection area; however, when the inclination angle $\theta 1$ exceeds a certain angle, there arises light that does not enter the condenser lens 3 even when it is reflected by the effective reflection area Su2, and the light does not contribute to the low beam light distribution PL. Therefore, the inclination angle $\theta 1$ is set to an appropriate angle corresponding to the lens aperture size of the condenser lens 3 and the focal length of the condenser lens 3.

When the head lamp according to the first embodiment is configured as a head lamp that is able to switch between both the low beam light distribution and the high beam light distribution, the shade is retracted to the area below the lamp optical axis in the high beam light distribution. For example, by rotating the shade with a rotary actuator, or the like, to move the shade from the front area of the reflection surface of the reflector to the retracted position, only light reflected downward at a large angle within light reflected by the effective reflection area is blocked by the shade, and the other light is transmitted and is condensed by the condenser lens for irradiation to thereby make it possible to obtain a high beam light distribution.

In the head lamp according to the first embodiment, if light reflected by the effective reflection area Su2 of the reflector 1 passes through the opening 613 of the main shade 61, the light may be irradiated as light that gives glare to an oncoming vehicle or a vehicle ahead. Therefore, in order for light reflected by the effective reflection area Su2 reliably not to pass through the opening 613, for example, the length of the sub-shade 62 may be formed slightly longer so that the rear end edge of the sub-shade 62 approaches the reflection surface. However, if the length of the sub-shade 62 is increased, in the case where the head lamp according to the first embodiment is applied to the above described low beam/high beam switching head lamp, when the shade 6 is moved to the retracted position in order to switch into a high beam light distribution, the rear end edge of the sub-shade 62 easily interferes with the reflector 1 or another component, for example, the rear end edge of the sub-shade 62 collides with the lower reflection area of the reflector 1. Thus, the shade 6 cannot be rotationally moved to a desired angle, and an intended high beam light distribution may not be obtained. In addition, as the sub-shade 62 elongates, the overall weight of the shade 6 increases, so a load on the actuator that moves the shade increases. Therefore, it is difficult to reduce the size of the actuator, and it is difficult to quickly switch the light distribution.

Figure 6:
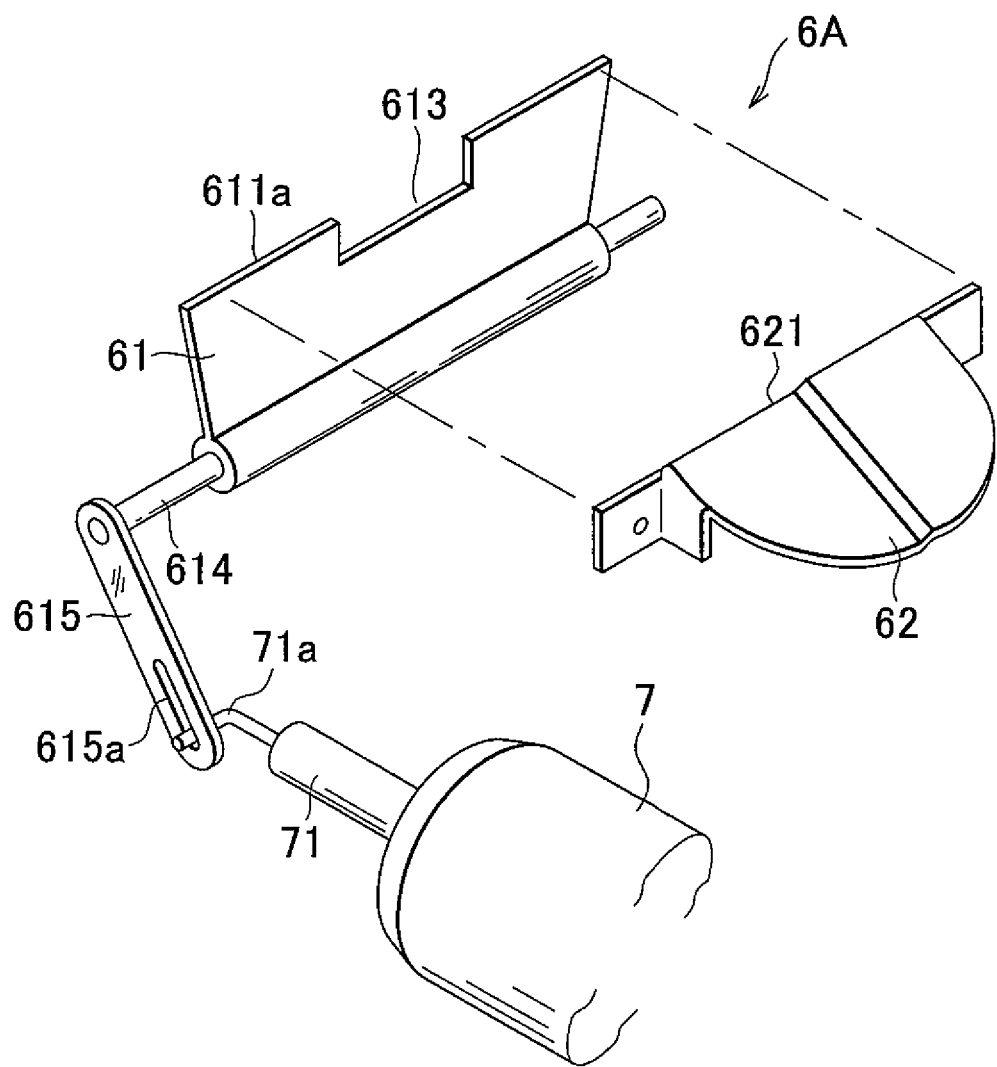
FIG. 6 is a partially exploded perspective view of a shade according to the second embodiment.
Figure 7:
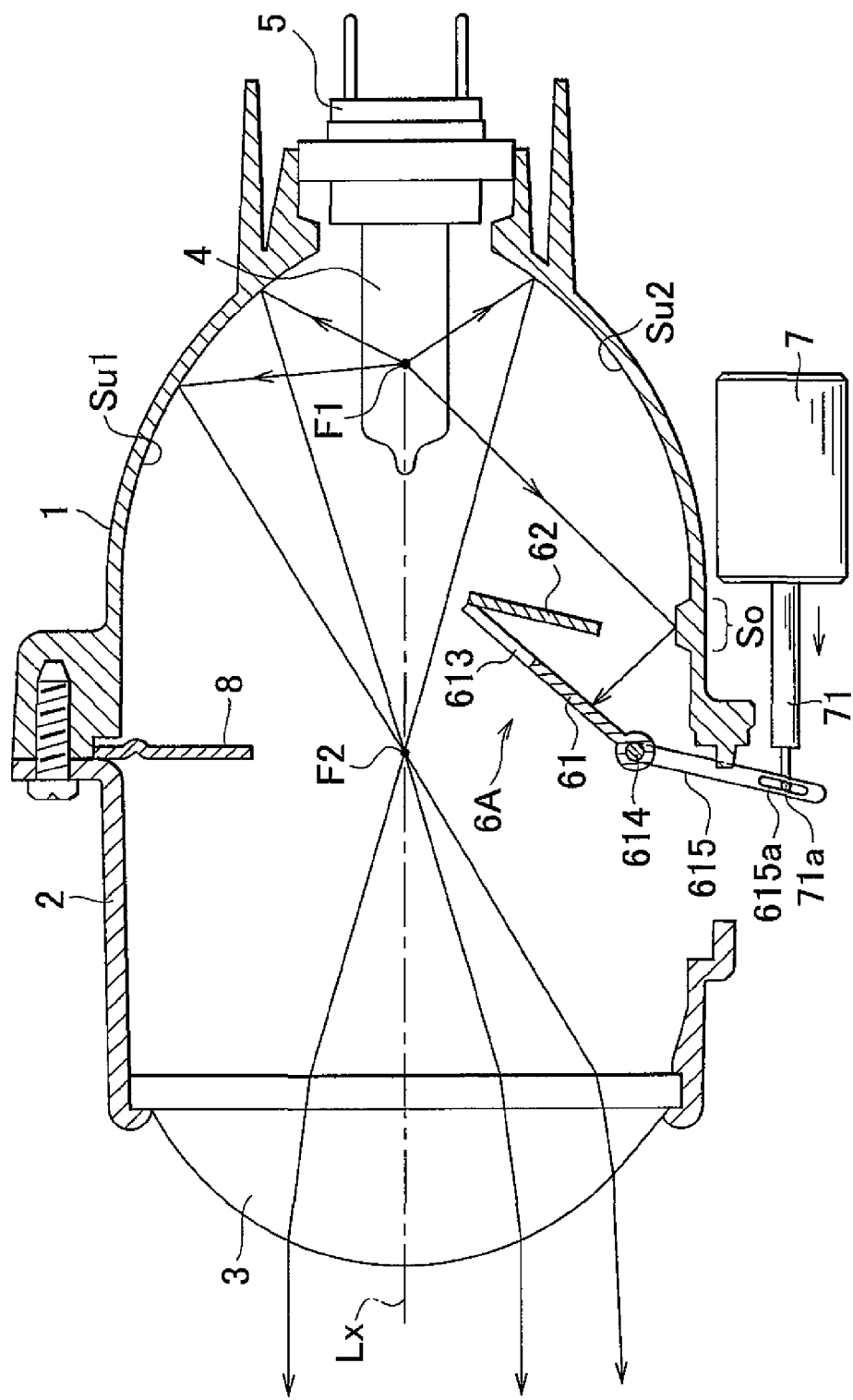
FIG. 7 is a sectional view of the head lamp forming a high beam light distribution according to the second embodiment.

FIG. 5 is a sectional view of a head lamp according to a second embodiment of the invention, which eliminates the above described problem. Like reference numerals denote the same or equivalent components to those of the first embodiment. FIG. 6 is a partially exploded schematic perspective view of a shade 6A according to the second embodiment. Here, no abnormal light blocking portion is provided for the main shade 61; instead, the abnormal light blocking portion is formed of a shield plate 8 formed separately from the shade, and is fixedly supported by the holder 2 in the upper area inside the reflector 1. Then, an upper edge 611a of the main shade 61 is formed substantially horizontally, and the opening 613 similar to that of the first embodiment is cut out and formed at the center portion of the upper edge. A rotary shaft 614 that extends laterally is integrally provided at the lower portion of the main shade 61, and the rotary shaft 614 is supported at both side portions of the holder 2 via bearings. In addition, a rotary actuator 7 is arranged outside the holder 2 to rotate the rotary shaft 614 to thereby rotate the shade 6A. Here, the rotary actuator 7 is an electrical reciprocating actuator. The rotary actuator is formed so that a driving rod 71 that extends or retracts is oriented in the longitudinal direction of the lamp and then a distal end portion 71a of the driving rod 71 is inserted in an oblong hole 615a so as to be coupled to the oscillating lever 615. The oblong hole 615a is formed in an oscillating lever 615 attached to the rotary shaft 614. A desired electrical signal is input to the reciprocating actuator 7 to extend or retract the driving rod 71 to thereby oscillate the oscillating lever 615. Then, the rotary shaft 614 integrated with the oscillating lever 615 rotates to rotationally move the shade 6A. Then, as shown in FIG. 5, the shade 6A is allowed to rotationally move between a low beam light distribution position and a high beam light distribution position. At the low beam light distribution position, the main shade 61 is pivoted and located substantially vertically. At the high beam light distribution position, the main shade 61 shown in FIG. 7 is tilted rearward, as will be described later.

Furthermore, in the second embodiment, as in the case of the first embodiment, an inclination angle θ2 of the sub-shade 62 with respect to the lamp optical axis Lx is larger than the inclination angle θ0 according to the related art. The inclination angle θ2 is further larger than the inclination angle θ1 according to the first embodiment. On the other hand, the length of the sub-shade 62 is shorter than the length of the sub-shade according to the first embodiment. That is, even when the sub-shade 62 is short, by increasing the inclination angle θ2, an intersection position P2 at which an imaginary extension plane Z2 of the sub-shade, shown in FIG. 5, intersects with the reflection surface of the reflector 1 shifts toward a front side as compared with that in the case of the first embodiment, so it is possible for light reflected by the effective reflection area Su2 not to pass through the opening 613. In addition, as in the case of the first embodiment, the lower surface of the sub-shade 62 is used as the reflection surface; in addition to this, in the second embodiment, the rear surface of the main shade 61 is also used as the reflection surface. Then, in the second embodiment, the OHS reflection area So of the reflector 1 is designed to reflect light from the light source 4 and to project the reflected light to the rear surface of the main shade 61.

In the second embodiment, in the low beam light distribution, the shade 6A is pivoted and located at a position at which the main shade 61 is located substantially vertically as shown in FIG. 5. Light emitted from the light source 4 and reflected by the effective reflection areas Su1 and Su2 of the reflector 1 is partially blocked by the shade 6A, and non-blocked light is irradiated forward by the condenser lens 3. In addition, at this time, the non-blocked light is irradiated to form the low beam light distribution PL having the cut line shown in FIG. 4A as in the case of the first embodiment because of the shape of the upper edge 621 of the sub-shade 62. At this time, the sub-shade 62 is short; however, the inclination angle θ2 is large, so even light reflected by an area located at the lowermost side of the effective reflection area Su2 is reliably blocked by the sub-shade 62. Therefore, light does not pass through the opening 613 of the main shade 61. On the other hand, light reflected by the OHS reflection area So is projected to the rear surface of the main shade 61, and the light is reflected on the rear surface of the main shade 61 and is subsequently projected to the lower surface of the sub-shade 62. The light reflected on the lower surface of the sub-shade 62 passes through the opening 613 and enters the condenser lens 3. Then, the light is irradiated forward and upward by the condenser lens 3 as OHS light to illuminate an OHS. That is, even when the inclination angle θ2 of the sub-shade 62 is increased as compared with that of the first embodiment to expand the area of the effective reflection area Su2 to thereby increase the effective utilization efficiency of light from the light source 4, it is possible to irradiate effective OHS light.

Figure 4B:
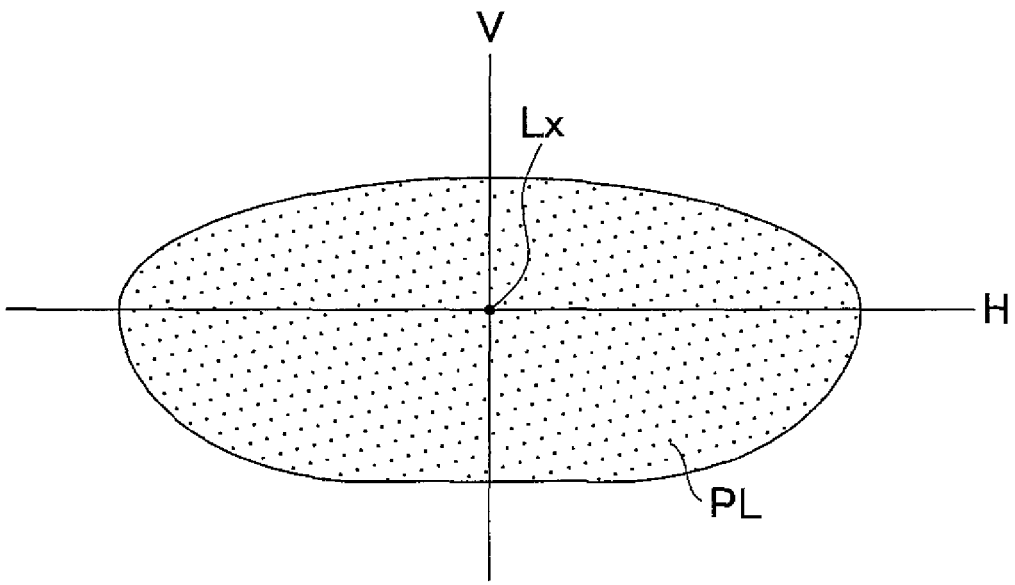
FIG. 4B is a light distribution diagram of a high beam light distribution.

In the high beam light distribution, the rotary actuator 7 is driven to extend the driving rod 71 to oscillate the oscillating lever 615 in the clockwise direction. Thus, the shade 6A is rotationally moved to the position shown in FIG. 7 and is retracted rearward and downward of the second focal point F2. By so doing, the amount of light reflected by the effective reflection area Su1 in the upper reflection area of the reflector 1 and blocked by the shade 6A reduces, and the light is irradiated from the condenser lens 3 toward an area above the lamp optical axis Lx to thereby obtain a high beam light distribution PH shown in FIG. 4B. At this time, because the length of the sub-shade 62 is short and the inclination angle θ2 is increased to bring the sub-shade 62 close to the main shade 61, when the shade 6A is rotationally moved, the sub-shade 62 does not interfere with, for example, the reflection surface of the reflector 1. Thus, the rotation angle of the shade 6A is increased by that much to reduce the amount of light blocked by the shade 6A to thereby make it possible to increase the amount of light of the high beam light distribution. In addition, by reducing the length of the sub-shade 62, the weight of the shade 6A is reduced to reduce a load on the rotary actuator 7, so it is possible to implement high speed switching between the low beam light distribution and the high beam light distribution without increasing the size of the lamp. At this time, light reflected by the OHS reflection area So is blocked by the main shade 61.

In the second embodiment, it is only necessary that light reflected by the OHS reflection area So is sequentially reflected by the main shade 61 and the sub-shade 62 so as to become appropriate OHS light, so the inclination angle of the main shade 61 with respect to the lamp optical axis Lx is not limited to the vertical direction shown in FIG. 5 but it may be designed so as to become an appropriate inclination angle. In addition, the rotary actuator 7 that serves as a shade actuator unit according to the aspect of the invention is not limited to an electric reciprocating actuator. As long as an actuator is configured to rotate the rotary shaft 614 of the shade 6A, the actuator may be configured to transmit rotation output from an electric motor to the rotary shaft by reducing the speed of the rotation. Furthermore, an actuator may be configured to reciprocally move the shade 6A vertically to advance into the reflector or retract from the inside of the reflector to thereby switch the light distribution.

In the second embodiment, light reflected by the OHS reflection area So is reflected on the rear surface of the main shade 61 and further reflected on the lower surface of the sub-shade 62 to pass through the opening 613 to form OHS light; however, depending on the relationship between the inclination angle and length of the sub-shade 62, it is possible to obtain desirable OHS light in such a manner that light is just reflected on the lower surface of the sub-shade 62 to pass through the opening 613 as in the case of the first embodiment. Alternatively, instead of reflecting light on the rear surface of the main shade 61, it is applicable that an additional reflection surface is provided and light is reflected on the additional reflection surface to direct light toward the lower surface of the sub-shade 62. The additional reflection surface may be integrated with the reflector 1 or separated from the reflector 1.

In the first and second embodiments, an incandescent bulb is used as the light source; instead, the bulb may be a discharge bulb, or a semiconductor light emitting element, such as an LED, may be used as the light source.

The outline of an embodiment of the invention will be described below.

The embodiment of the invention relates to a vehicle head lamp that includes: a light source; a reflector that reflects light emitted from the light source; a condenser lens that irradiates the light reflected by the reflector forward; and a shade that blocks part of the light reflected by the reflector to obtain a desired light distribution. In the head lamp, the shade includes a main shade that has an opening for passing overhead sign light irradiated forward and upward and a sub-shade that is provided so as to be inclined rearward and downward from an upper edge of the main shade in order to obtain a cut line of the light distribution, and the reflector has an OHS reflection area that is used to project part of the reflected light toward a lower surface of the sub-shade and that allows the light reflected on the lower surface to pass through the opening of the main shade as the OHS light.

In the head lamp, the OHS reflection area may be an area on a front side of the lamp with respect to a position at which an imaginary extension plane extended along a surface of the sub-shade intersects with a reflection surface of the reflector, and a reflection area on a rear side to an upper side of the lamp with respect to a position of the OHS reflection area on the reflector may be configured as an effective reflection surface for forming the light distribution.

In the head lamp, the imaginary extension plane extended from an upper end side of the sub-shade may be inclined so as to extend toward a peripheral portion of the condenser lens or a radially outer side of the peripheral portion.

The head lamp may further include a shade actuator unit that causes the shade to advance or retract inside the reflector, a low beam light distribution may be formed when the shade is located so as to advance forward of a vehicle, and a high beam light distribution may be formed when the shade is located so as to retract rearward of the vehicle.

With the above configuration, the length of the sub-shade may be reduced, and, even when the head lamp is configured as a lamp that uses the shade actuator unit to switch between the low beam light distribution and the high beam light distribution, the shade actuator unit may be reduced in size, and quick switching of the light distribution may be implemented.

In the head lamp, the light reflected by the reflector may be condensed, part of the light reflected by the OHS reflection area may be projected to a rear surface of the main shade, the lower surface of the sub-shade may reflect light, and the head lamp may be configured as a low beam/high beam switching head lamp.

In the head lamp, the effective reflection surface of the reflector may have a rotational ellipsoidal shape, the light source may be arranged at one focal point of the rotational ellipsoidal shape, and the light reflected by the effective reflection surface may be condensed to the other focal point of the rotational ellipsoidal shape.

In the head lamp, an upper end of the sub-shade may be arranged at the other focal point.

The aspect of the invention may be applied to a head lamp that irradiates OHS light.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A vehicle head lamp comprising:
   a light source;
   a reflector that reflects light emitted from the light source;
   a condenser lens that irradiates the light reflected by the reflector forward; and
   a shade that blocks part of the light reflected by the reflector to obtain a desired light distribution, wherein
   the shade includes a main shade that has an opening for passing overhead sign light irradiated forward and upward and a sub-shade that is provided so as to be inclined rearward and downward from an upper edge of the main shade in order to obtain a cut line of the light distribution, and
   the reflector has an OHS reflection area that is used to project part of the reflected light toward a lower surface of the sub-shade and that allows the light reflected on the lower surface to pass through the opening of the main shade as the OHS light;
   wherein an effective reflection surface of the reflector has a rotational ellipsoidal shape, the light source is arranged at one focal point of the rotational ellipsoidal shape, and the light reflected by the effective reflection surface is condensed to an other focal point of the rotational ellipsoidal shape;
   the OHS reflection area is formed so that light directly emitted from the one focal point and reflected by the OHS reflection area is reflected by the lower surface of the sub-shade.

2. The head lamp according to claim 1, wherein
   the OHS reflection area is an area on a front side of the lamp with respect to a position at which an imaginary extension plane extended along a surface of the sub-shade intersects with a reflection surface of the reflector, and
   a reflection area on a rear side to an upper side of the lamp with respect to a position of the OHS reflection area on the reflector are configured as the effective reflection surface for forming the light distribution.

3. The head lamp according to claim 2, wherein the imaginary extension plane extended from an upper end side of the sub-shade is inclined so as to extend toward a peripheral portion of the condenser lens or a radially outer side of the peripheral portion.

4. The head lamp according to claim 1, further comprising a shade actuator unit that causes the shade to advance or retract inside the reflector, wherein
   a low beam light distribution is formed when the shade is located so as to advance forward of a vehicle, and a high beam light distribution is formed when the shade is located so as to retract rearward of the vehicle.

5. The head lamp according to claim 4 is configured as a low beam/high beam switching head lamp.

6. The head lamp according to claim 1, wherein the light reflected by the reflector is condensed.

7. The head lamp according to claim 1, wherein the lower surface of the sub-shade reflects light.

8. The head lamp according to claim 1, wherein an upper end of the sub-shade is arranged at the other focal point.

9. The head lamp according to claim 4, wherein part of the light reflected by the OHS reflection area is projected to a rear surface of the main shade.

* * * * *